United States Patent [19]

Kreeft et al.

[11] Patent Number: 4,632,327

[45] Date of Patent: Dec. 30, 1986

[54] APPARATUS FOR FILLING A CASSETTE WITH A LENGTH OF MAGNETIC TAPE

[75] Inventors: Hendrik K. Kreeft; Adrianus F. Teunissen, both of Eindhoven, Netherlands

[73] Assignee: U.S. Philips Corporation, New York, N.Y.

[21] Appl. No.: 562,755

[22] Filed: Dec. 19, 1983

[30] Foreign Application Priority Data

Oct. 17, 1983 [NL] Netherlands ............................ 8303566

[51] Int. Cl.⁴ .......................... B31F 5/06; B65H 21/00
[52] U.S. Cl. .................................. 242/56 R; 156/502; 156/506
[58] Field of Search ............. 242/56 R; 156/502, 505, 156/506

[56] References Cited

U.S. PATENT DOCUMENTS

| | | | |
|---|---|---|---|
| 4,497,454 | 2/1985 | Woodley | 242/56 R |
| 4,512,904 | 4/1985 | King | 242/56 R |
| 4,549,925 | 10/1985 | Goguen | 242/56 R |

*Primary Examiner*—John M. Jillions
*Attorney, Agent, or Firm*—David R. Treacy

[57] ABSTRACT

An apparatus for filling a cassette with a length of magnetic tape, comprising a cassette holder movable between at least two positions; a splicing table having three rectangular aligned vacuum pads, a first pad being arranged on a stationary first block of a splicing table, and second and third pads being arranged on a second, pivotal block on the splicing table; an extraction member for withdrawing leader tape from the cassette; a cutting member for severing the leader tape and a length of magnetic tape; a splicing assembly for splicing the magnetic tape to the leader; and a winding device for winding the magnetic tape and leader after splicing. The cassette holder is pivotable about an axis between a first position straight above the splicing table, where it cooperates with the winding device, and a second position inclined to the splicing table which provides room for operation of the splicing assembly. The cassette holder pivots about an axis lying substantially in a plane through the second block pivotal axis, which plane bisects the width of the first vacuum pad between the pivotal axis of the second block and the upper surface of the first vacuum pad, the two pivotal axes being substantially parallel.

15 Claims, 6 Drawing Figures

APPARATUS FOR FILLING A CASSETTE WITH A LENGTH OF MAGNETIC TAPE

BACKGROUND OF THE INVENTION

The invention relates to an apparatus for filling a cassette with a length of magnetic tape, which cassette comprises two adjacent reels which are connected to a length of leader tape, which apparatus comprises:

a cassette holder for holding the cassette to be filled, which cassette holder is movable between at least two positions, a splicing table for supporting a leading and a trailing end portion of the magnetic tape and for supporting the leader tape, which table is provided with three rectangular vacuum pads which are arranged aligned to each other, a first one of said vacuum pads being arranged on a stationary first block of the splicing table and a second and a third vacuum pad being arranged adjacent each other on a second block of the splicing table, which second block is pivotable about a pivotal axis to bring the second and the third vacuum pad alternately in line with the first vacuum pad, an extraction member for drawing the length of leader tape wound around the reels out of the cassette and positioning the leader tape on the splicing table, a cutting member for cutting the leader tape into two parts and severing a length of magnetic tape having both a leading and a trailing end, a splicing member for splicing the magnetic-tape leading end and trailing end positioned on the splicing table to the ends of the parts of leader tape formed by the cutting member, and a winding member for winding the length of magnetic tape and leader tape into the cassette in cooperation with one of the reels.

Such apparatus is known and has already been in use on a large scale for a considerable time. This apparatus operates with a splicing table using the alternation principle for cutting and splicing the leader tape and the magnetic tape by bringing the second and the third vacuum pad alternately into line with the first vacuum pad. In this known apparatus a comparatively great length of leader tape is withdrawn from the cassette and positioned on the splicing table and, for splicing the leader tape to the magnetic tape the cassette holder is translated from the winding position to the splicing position over a comparatively long distance to provide at least enough clearance above the splicing table for the punch of the splicing member. This movement of the cassette holder and the subsequent return movement of the splicing position require a relatively high energy because of the comparatively high mass of the cassette holder, resulting in a fairly long cycle time between the beginning and the end of these movements. Since in the known apparatus the available length of leader tape is fairly great these movements of the cassette holder do not disturb the positions of the ends of the leader tape on the splicing table. However, if by means of the known apparatus a cassette with a comparatively short leader tape, such as the recently developed 8-mm video cassette, would have to be filled with a magnetic tape, these movements of the cassette holder could exert undesired longitudinal forces on the leader tape, thereby disturbing the positions of the said end of the leader tape on the splicing table.

SUMMARY OF THE INVENTION

It is the object of the invention to construct an apparatus of the type specified in such a manner that the movements of the cassette holder from the winding position to the splicing position and vice versa can be performed within a comparatively short cycle time To this end the invention is characterized in that the cassette holder is pivotable about a pivotal axis between a first position straight above the splicing table for cooperation with the winding member and a second position, in which it is inclined relative to the splicing table and in which the splicing member is operable, the pivotal axis of the cassette holder is disposed at least substantially in a plane through the pivotal axis of the second block, which plane bisects the width of the first vacuum pad, the pivotal axis of the cassette holder extends at least substantially parallel to the pivotal axis of the second block between the second block pivotal axis and the upper surface of the first vacuum pad.

The pivotal arrangement of the cassette holder results in accurate and easy to realize movements of the holder owing to the comparatively small tolerances of the pivotal parts. The location of the pivotal axis of the cassette holder in the bisecting plane, between the pivotal axis of the second block and the first vacuum pad, ensures that in the second position of the holder the punch of the splicing member can move freely towards the splicing table, while at the same time the movement of a cassette holder between the first or winding position and the second or splicing position can be minimal, thereby minimizing the cycle time of the back and forth movement of the holder. Furthermore, the location of the pivotal axis of the holder ensures that the ends of the leader tape on the splicing table are not subjected to undesired forces during the pivotal movement of the holder to the second position. Thus, the ends of the leader tape remain in the correct position on the splicing table during the movements of the holder. In this way the pivotal arrangement of the cassette holder with the said location of the pivotal axis of the holder enables the distance between the splicing table and a cassette contained in the holder to be minimized and thereby allows cassettes with a comparatively short length of leader tape, such as the afore-mentioned 8-mm video cassette, to be handled.

A preferred embodiment of an apparatus in accordance with the invention is characterized in that the pivotal axis of the cassette holder is situated at substantially equal distances from the pivotal axis and the upper surface of the first vacuum pad. This location of the pivotal axis halfway between the pivotal axis of the second block of the splicing table and the upper surface of the first vacuum pad results in an optimum situation, providing sufficient clearance for the passage of the punch in the second position of the holder with a minimal increase in distance between the cassette and the vacuum pads of the splicing table. Having only a small increase in this distance is important in order to prevent the ends of leader tape on the splicing table from being subjected to undesired forces which tend to move the tape on or lift it off the vacuum pads.

Another preferred embodiment of an apparatus in accordance with the invention is characterized in that in the first position of the cassette holder the bisecting plane, in which the pivotal axis of the cassette holder is situated, coincides with a plane or symmetry through the reel of the cassette which cooperates with the winding member. As a result of this the leading end of the magnetic tape which is situated on the splicing table is disposed symmetrically relative to the take-up reel of the cassette before the magnetic tape is wound into the cassette. This ensures a correct alignment of the tape relative to the reel when the magnetic tape is wound into the cassette, thereby precluding undesired effects during winding.

Yet another preferred embodiment of an apparatus in accordance with the invention is characterized in that the pivotal axis of the cassette holder is defined by a pivoting mechanism arranged in a slide which is translatable on guide rods. Thus, in addition to the pivoting movement between the winding position and the splicing position the cassette holder can also be translated to a position farther away. The extra distance makes it easy to insert the cassette to be filled into the apparatus and remove this cassette form the apparatus after filling. During these movements the cassette may be subjected to further operations, such as positioning the cassette in the holder, unlocking and opening a system of covers on the cassette, and performing these operations in the reverse sequence.

A preferred embodiment of an apparatus in accordance with the invention is further characterized in that the extraction member comprises two pull-out pins which are arranged on a yoke, which are situated one on each side of the splicing table, and which are movable back and forth with the yoke relative to the splicing table. The presence of the pull-out pins enables the leader tape to be drawn completely out of the cassette and to be passed across the two aligned vacuum pads of the splicing table, so that the leader tape can be cut into two parts of equal lengths by means of the cutting member. The pull-out pins ensure that both parts of the leader tape have the same length, which is of particular importance for the afore-mentioned 8-mm video cassette, where such an equal length of both parts of leader tape is prescribed.

Yet another preferred embodiment of the apparatus in accordance with the invention is characterized by comprising an alignment pin which in an operating position keeps the magnetic tape aligned relative to the plane of symmetry of the reel which cooperates with the winding member during winding. The alignment pin is arranged on a pivotal lever and can be pivoted from the operating position to a rest position in which the alignment pin is not in contact with the leader tape or the magnetic tape. The alignment pin ensures that after the magnetic tape has been spliced to the end of the leader tape, the magnetic tape is aligned correctly relative to the take-up reel during winding, the pivotal arrangement of the alignment pin on the lever ensuring that the alignment pin does not form an obstruction when the cassette is positioned above the splicing table and the leader tape is pulled out. Such an alignment pin is of particular importance in cassettes which are not equipped with internal tape guide elements which can guide the tape in the correct direction towards the take-up reel. This is the case in the afore-mentioned 8-mm video cassettes. In this respect an embodiment of the invention is characterized in that in the operating position of the alignment pin and in the first position of the cassette holder the alignment pin and the cassette are positioned in such a manner relative to each other that during winding, after leaving the alignment pin, the magnetic tape is fed directly to the cassette reel which cooperates with the winding member without coming into contact with other parts of the cassette.

A further preferred embodiment of the invention is characterized in that the cassette holder comprises:

pressure elements which urge a supporting surface of the cassette against supports of the holder, locating pins, which position the cassette in the holder, and an unlocking element which unlocks a front-cover system of the cassette.

This ensures that the cassette occupies the correct position in the cassette holder relative to the other parts of the apparatus, such as the splicing table and the splicing member, and that once the cassette has been inserted into the holder the cassette can be subjected to operations such as unlatching of the system of front covers.

In this respect a further embodiment of the invention is characterized in that during the movement of the slide, a contoured plate urges the system of front covers into an open position. In this manner the system of front covers can be opened during the movement of the holder. Thus, the cassette assumes a position above the splicing table in which position in which the leader tape can be pulled out by means of the extraction member immediately after unlatching of the brake mechanism of the cassette. This step also contributes to a minimal processing time of the cassette in the apparatus.

An embodiment of the invention will now be described in more detail, by way of example, with reference to the drawings.

DESCRIPTION OF THE PREFERRED EMBODIMENT

Figure 1:
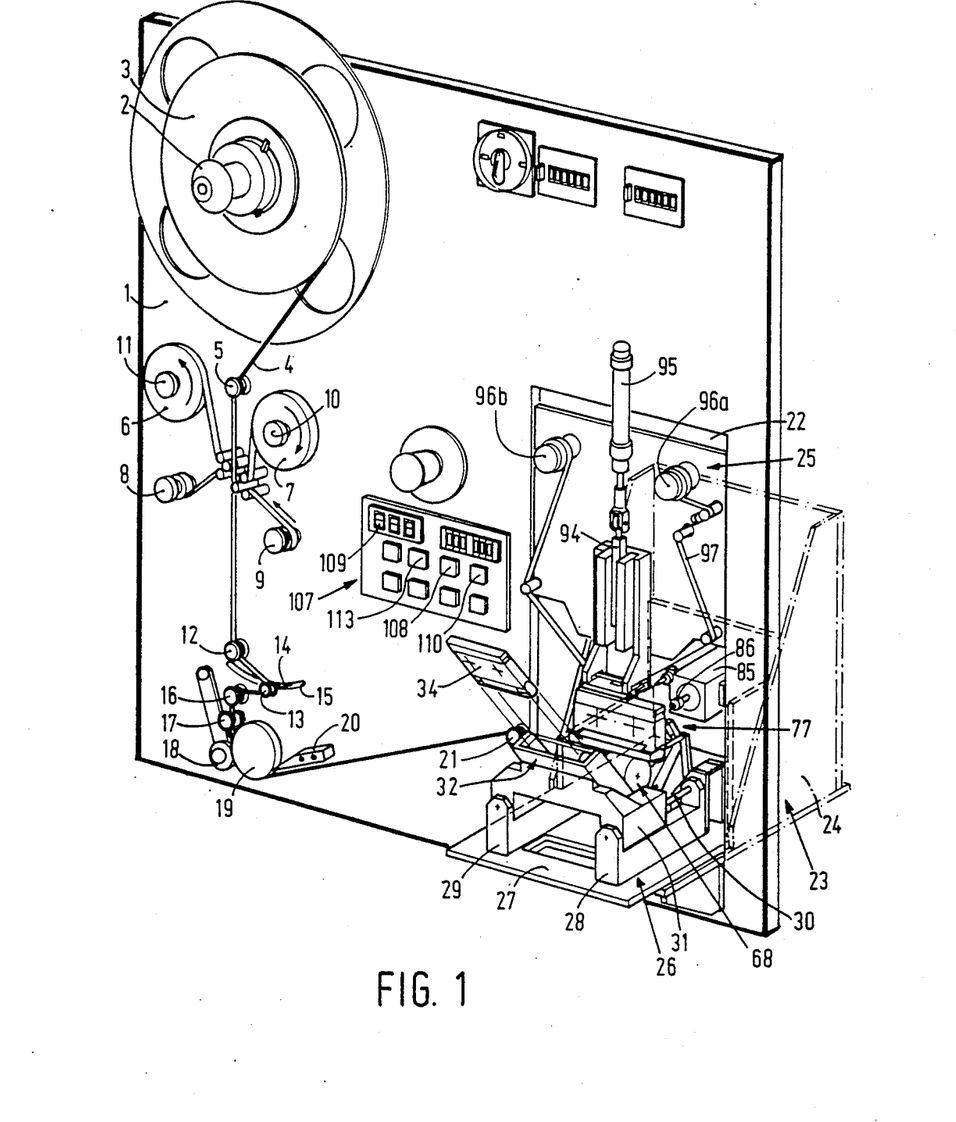
FIG. 1 is a perspective front view of the apparatus in accordance with the invention.

The apparatus shown in FIG. 1 comprises a front plate 1, in which a spindle 2 is journalled. The spindle 2 carries a tape reel 3. The reel 3 contains a magnetic tape 4. The magnetic tape 4 is guided past a guide roller 5 and is subsequently passed between two lengths of cleaning tape 6 and 7. The cleaning tape 6 and 7 is led from the reels 8 and 9 to take-up reels 10 and 11 in a direction opposite to the direction of transport of the magnetic tape 4. Subsequently, the magnetic tape 4 is guided past a guide roller 12 and over a pulley 13, arranged on a control arm 14, which control arm 14 is situated behind the front plate 1 and is spring-biased to the right in FIG. 1, the pulley 13 extending from the back of the front plate 1 through a slot 15. Subsequently, the magnetic tape 4 is led past a guide roller 16 and an alignment roller 17. After this the magnetic tape is pressed against the capstan 19 by means of a pressure roller 18. After leaving the capstand 19 the tape 4 is led past a tape scraper 20 in order to detach the tape from the capstan, because the tape may stick to the capstan 19 as a result of static charges. After the scraper 20 the magnetic tape 4 is fed past a guide roller 21.

The front plate 1 has a rectangular opening 22 in which a cutting/slicing roller unit 23 is situated. The unit 23 is accomodated in an outer casing 24 which is secured to the front plate 1. A splicing assembly 25 is rigidly connected to the outer casing. Moreover, the outer casing 24 accommodates a unit 26, which is interchangeable. The unit 26 can be slid out through the front opening 22, for example in the event of faults or for maintenance purposes. The unit 26 comprises a frame 27, to which two guide blocks 28 and 29 are secured. The guide blocks 28 and 29 carry guide rods 30 (see FIG. 2), which provide a straight-line guidance for a slide 31. The slide 31 comprises two pivots by means of which a cassette holder 32 is pivotable relative to the slide 31 about a pivot axis 33. The cassette holder 32 is open at the top, so that a cassette 34 can be lowered into the holder 32. (See FIG. 1). In FIG. 1 the cassette 34 is shown transferred to to another position, i.e. the winding position. The cassette holder 32 is substantially U-shaped and comprises supporting members 35 and 36 (see FIG. 2) on both sides of the cassettes, centering pins 37 on the upper sides of said member projecting into the interior of the cassette holder 32. The centering pins 37 are each connected to an actuating rod 38 which is formed integral with projections 39 at the front of the cassette holder 32. A compression spring 40 is arranged around the actuating rod 38, thereby urging the rod 38 in the direction indicated by the arrow 41. In the initial position of the cassette holder, which position is shown in FIG. 1, the projections 39 are urged against unlocking strips 42 arranged on the slide 31. In a similar way an actuating rod 43 is arranged in the supporting member 35, which rod has a projection 44 which is urged against a seat 46 on the slide 31 by a compression spring 45. The end of the rod 43 is connected to an unlocking element 47. Two pressure elements in the form of rollers 48 are arranged in the bottom of the cassette holder 32. The rollers 48 are carried by arms 49 which are pivoted by tension springs in such a manner that the rollers 48 are pulled towards the interior of the cassette holder 32. Moreover, the cassette holder 32 has a stop 51, which ensures that a cassette can be inserted into the holder 32 up to a specific depth. After the holder has been slightly pivoted in a manner to be described hereinafter a cassette in the holder 32 is positioned by means of the pin-shaped elements 37. The pins 37 engage centering holes, not shown, in a supporting surface of the cassette. In this way the cassette is positioned in a plane parallel to the base 32a of the holder 32. The rollers 48 ensure that the afore-mentioned supporting surface of the cassette is urged against the supporting members 35 and 36. In this way the cassette is positioned in a direction perpendicular to the base 32a of the holder. This ensures that the position of the cassette in the holder 32 is defined accurately in three dimensions.

Figure 2:
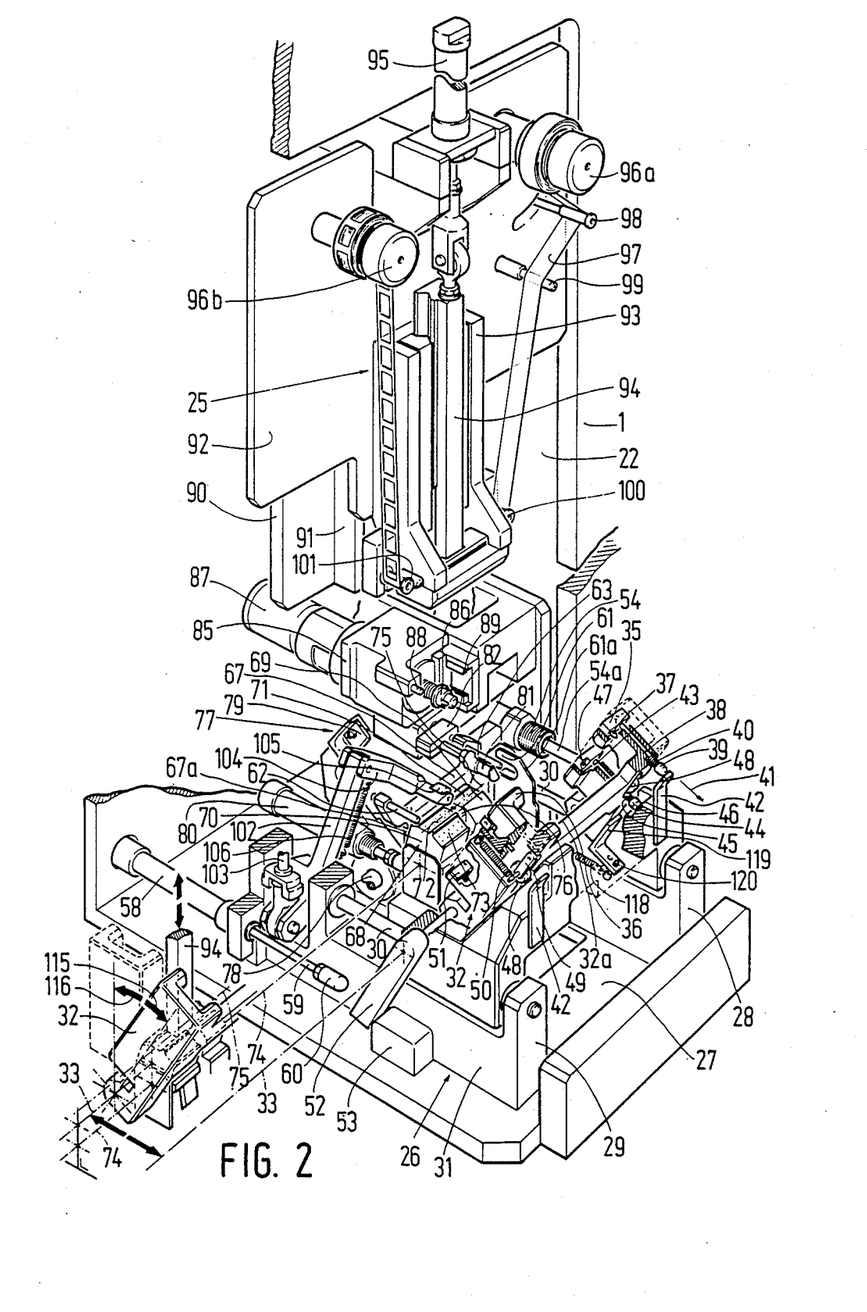
FIG. 2 is an enlarged front view, partly in section, of a part of the apparatus shown in FIG. 1.

The pivotal movement of the holder 32 is obtained by means of a lever 52 which, viewed in FIG. 2, is situated to the left of the guide block 29. The lever 52 extends downwardly from the pivotal axis 33 towards the frame 27 and in the position shown in FIG. 2 it lies against a block 53. This is achieved by means of a pneumatic cylinder 54, whose piston rod 54a is connected to the slide 31. The cylinder 54 is capable of moving the slide 31 to the right in FIG. 2, thereby urging the actuating rods 38 and 43 into an initial position via the lever 52 and the projection 53, the centering pins 37 and the unlocking element 47 being retracted with respect to the interior of the holder 32.

Figure 5:
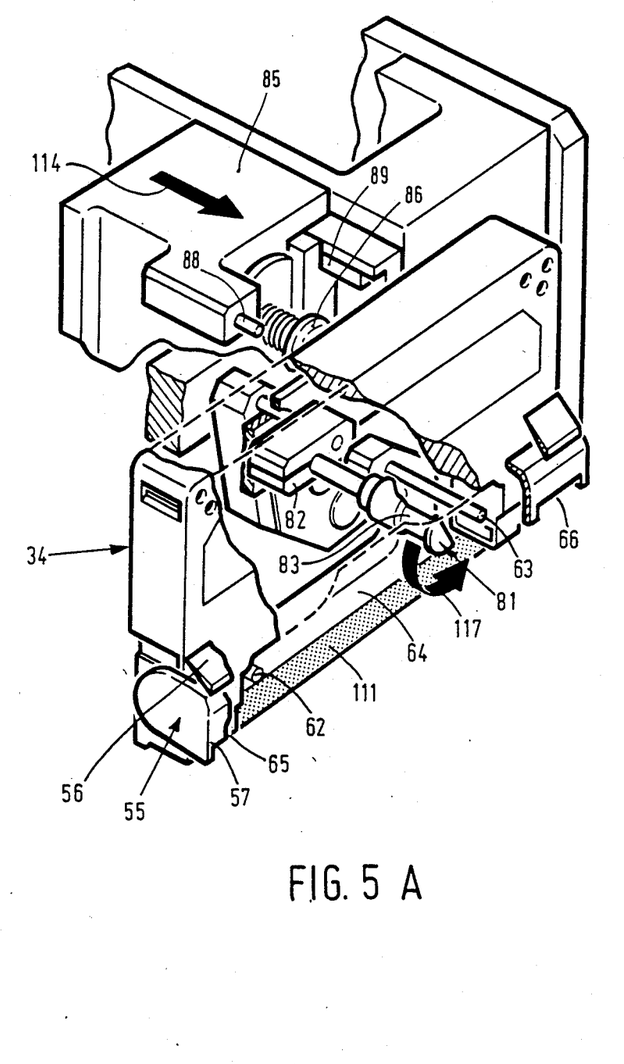
FIGS. 5A and 5B are perspective views of parts of the apparatus in accordance with the invention, showing two positions of the alignment pin.

When the cylinder 54 acts in the other direction, the springs 40 cause the holder 32 to pivot slightly while the end of the lever 52 remains in contact with the block 53; this causes the centering pins to engage the cassette 34, and the unlocking element 47 to actuate a latch, not shown, of the magnetic-tape cassette 34. This latch locks a system 55 of front covers of the magnetic-tape cassette, which system comprises an inner cover 56 and an outer cover 57 (see FIG. 5) which latch is now unlocked by the element 47. After the cassette holder 32 has been pivoted slightly about the axis 33 a pneumatic cylinder 58 is actuated. This cylinder comprises a piston rod 59 whose end carries an actuator 60. The actuator 60 now acts against the lever 52 and brings the cassette holder 32 into a vertical position relative to the frame 27. The cylinder 58 now remains activated. Since the cylinder 54 is more powerful than the cylinder 58, the piston rod 54a can now move the cassette holder 32 in the vertical position to the left in FIG. 2. As a result of this movement, which is a straight-line movement, an oblique upwardly directed guide portion of the front-cover system 55 abuts a contoured plate 61, causing the inner cover 56 and the outer cover 57 to assume the position shown in FIG. 5. At the end of the movement the cassette holder 32 assumes the position indicated by the broken lines in FIG. 2 (see left-hand side of FIG. 2). This is the winding position of the cassette holder 32. In this position two pull-out pins 62 and 63 project into a passage 64 of the cassette behind the front-cover system 55 (see FIG. 5). The pins are then disposed substantially symmetrically with respect to the plane of symmetry (not shown) which bisects the length of the cassette, located at equal distances from reels 112 of the cassette. Moreover, the pins are situated near the front openings 65 and 66, which are located near the side walls of the cassette. The pull-out pins 62 and 63 are arranged on a yoke 67 which is actuated by a pneumatic cylinder, not shown, which is capable of performing an upward and a downward movement. Compression springs 67a urge the yoke in the upward direction.

Figure 4:
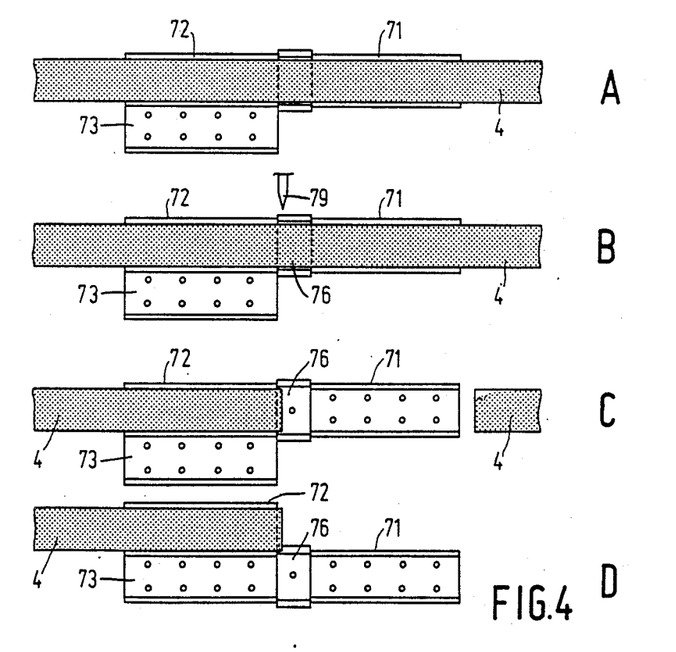
FIGS. 4A–4D are schematic views of the splicing table during different steps of operation.

The frame 27 further carries a splicing table 68 comprising a first stationary block 69 and a second pivotal block 70. The first block 69 comprises a first vacuum pad 71 of the splicing table and the second block 70 comprises a second vacuum pad 72 and a third vacuum pad 73. A plurality of vacuum ducts terminate in vacuum pads and, in a manner not shown, they are connected to a vacuum line via a switch. The block 70 is pivotable about a pivotal axis 74, the pivotal axis 74 extending parallel to a plane of symmetry which bisects the width of the first vacuum pad 71, which plane bears the reference number 75 in FIG. 2. The upper surfaces of the vacuum pads 72 and 73 extend parallel to and equally spaced from the pivotal axis 74. In a manner to be described herein after the vacuum pads 72 and 73 can alternately be brought in line with the vacuum pad 71. The first block 69 further comprises an anvil 76, in which another vacuum duct terminates. A cutting member 77 is connected to the frame 27 so as to be pivotable about a spindle 78 and comprises a cutter 79 which after the pivotal movement about the spindle 78 can move towards the anvil 76 from the left to the right in FIG. 2. The cutting member 77 is also actuated by a pneumatic cylinder, not shown. The second block 70 can be pivoted about the pivotal axis 74 by means of a pneumatic cylinder 80. The resulting positions of the vacuum pads 72 and 73 are shown in FIG. 4.

The frame 27 further carries an alignment pin 81 (see also FIG. 5), which is arranged on a pivotal lever 82 and which is pivoted between an operating position and a rest position by a pneumatic cylinder, not shown. FIG. 5a shows the rest position and FIG. 5b shows the operating position of the alignment pin 81. The alignment pin 81 is of semicircular cross-section and comprises a guide portion 83. The guide portion 83 is disposed symmetrically with respect to the afore-mentioned plane of symmetry 75 through the first vacuum pad 71. Adjoining the guide portion 83 the alignment pin has a recess 84, which as is shown in FIG. 5b extends around a part of the cassette housing, so that the alignment pin 81, as it moves towards the operating position cannot run against the cassette housing.

Above the alignment pin a housing 85 is arranged so as to be slidable in a direction perpendicular to the plane of symmetry 75, which housing carries a winding member comprising a winding mandril 86 which is driven by means of a motor 87. Further, the housing 85 carries an unlocking pin 88, which in a manner not shown can cooperate with the latching means of a braking mechanism, not shown, in the cassette. When the housing 85 moves in the forward direction the pin 88 unlocks the braking mechanism of the cassette, thereby releasing the reels 112 of the cassette. The housing 85 is guided on a rail 89 on the frame 27 and is moved by means of a pneumatic cylinder, not shown.

On the outer casing 24 a gusset 90 is arranged which carries a guide 91. The guide 91 guides a mounting plate 92, in the upward and downward direction in a direction parallel to the plane of symmetry 75. A punch 94 is guided in the upward and downward direction by a guide 93 on the mounting plate 92. In a manner not shown the punch 94 comprises a longitudinal vacuum duct which in a manner to be described hereinafter serves to retain an adhesive-tape portion. In a manner not shown this vacuum duct is connected to a vacuum switch and a vacuum line. On the upper side the punch 94 is connected to the piston rod of a pneumatic cylinder 95. This cylinder causes the punch 94 to move up and down. Furthermore, two rollers 96a and 96b are mounted for rotation on the mounting plate 92. The left-hand roller 96b in FIG. 2 is driven during operation of the splicing member 52. Behind the right-hand roller 96a a friction plate, not shown, is arranged, which brakes this roller. The right-hand roller 96a contains an amount of adhesive tape 97, which is led from the roller 96a around a tension roller 98. On the back of the mounting plate 92 the tension roller 98 is arranged on a lever, not shown, which can be pivoted about the axis of rotation of the roller 96a. From the tension roller 98 the adhesive tape 97 is passed over a spindle 99, the tension roller 98 ensuring that the adhesive tape 97 is sufficiently taut. In this way it is achieved that the spindle 99 is rotated by the adhesive tape 97, which rotation is measured in a manner not shown. Thus, the length of adhesive tape supplied by the roller 96a is measured. From the spindle 99 the adhesive tape 97 moves past a guide roller 100, subsequently the adhesive tape 97 extends horizontally underneath the punch 94 across a guide roller 101, and finally it is taken up by the left-hand roller 96b. As is shown in FIG. 2 portions of adhesive tape 97 are punched out by the punch 94.

Furthermore, a lever 102 is pivotally arranged on the frame 27, which lever pivots about the end portion of the left-hand guide rod 30 in FIG. 2, the lever 102 being actuated by a piston rod 103 of a pneumatic cylinder, not shown. At the end which is remote from the rod 30 the lever 102 is pivotally connected to an arm 104, whose free end carries a pressure roller 105. Between the arm 104 and the lever 102 a tension spring 106 is arranged, which causes the arm 104 to pivot against a stop, not shown. If the roller 105 is moved across the splicing table 98 by means of the piston rod 103 the roller 105 is thus moved across the surfaces of the vacuum pads under spring force.

The apparatus described in the foregoing operates as follows. Firstly, a full tape reel 3, also referred to as pancake, is placed on the spindle 2. Subsequently, the magnetic tape 4 is threaded past the various guide rollers and between the pressure roller 18 and the capstan 19. The splicing table 68 now occupies the position shown in FIG. 4A, the second vacuum pad 72 being disposed in line with the first vacuum pad 71. During the first operation a button 108 on a control panel 107 is depressed, so that the control electronics of the apparatus are switched on. Subsequently a display 109 on the panel 107 indicates whether the control electronics have detected any faults in the apparatus. If no such faults are detected a button 110 is pressed which results in such a length tape 4 being supplied that this tape can be positioned on the splicing table 68. By again pressing the button 110 the cutter 79 is actuated, so that the magnetic tape 4 is severed. This yields the situation shown in FIG. 4B, after which the residual length of magnetic tape 4, shown on the right-hand side in FIG. 4C, can be removed. The leading end of the magnetic tape 4 is now situated on the vacuum pad 72. The next operation is the insertion of a cassette 34 into the holder 32. This cassette contains a leader tape 111, see FIG. 5, which in the cassette shown, which is of the so-called 8-mm video type, has a limited length. This length is approximately 160 mm in total, reckoned from the point of attachment to the two reels 112.

Subsequently, the operator presses a start button 113 on the panel 107. As a result of this the slide 31 is actuated by means of the cylinder 54. The holder 32 is pivoted slightly, during the first portion of the full translation, due to the previously described action of the springs 40, while at the same time the cassette is firmly centered in the holder by the pins 37, and the holder is then pivoted about the pivotal axis 33 under the influence of the cylinder 58, whose actuator 60 urges against the lever 52 (for this reference is made to the preceding part of the description). The movement of the slide 31 causes the latch of the front-cover system 55 of the cassette to be released by the unlocking element 47 and the inner cover 56 and the outer cover 57 to be opened by the contoured plate 61 upon abutment by the guide portion of the cover system 55. The holder 32 has now assumed the position indicated in FIGS. 2 and 3 by the broken lines. This is the winding position, in which the holder extends parallel to the front plate 1. In this position the pivotal axis 74 of the second block 70 is disposed below the pivotal axis 33 of the holder 32, the pivotal axis 33 being situated substantially halfway between the pivotal axis 74 and the upper surfaces of the vacuum pads 71 and 72. Preferably, the pivotal axis 33 is disposed in the plane 75 in this position of the holder 32.

Subsequently the housing 85, which carries winding mandrel 86 and the unlocking pin 88, is moved forwards in the direction indicated by the arrow 114 in FIG. 5a.

Figure 3:
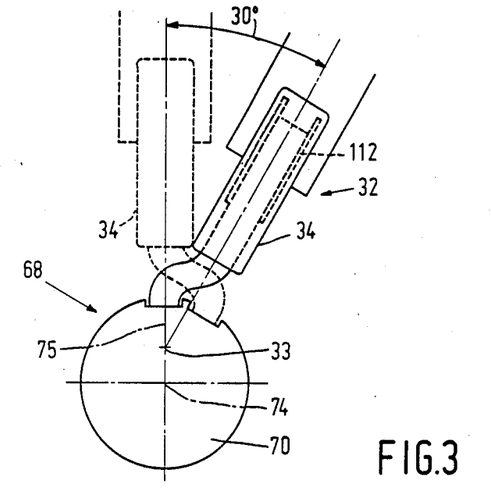
FIG. 3 schematically shows two positions of the cassette holder of the apparatus in accordance with the invention.

During this operation the braking mechanism, not shown, of the cassette 34 is lifted. The reel 112 is then also positioned in the aforementioned plane 75, so that the plane of symmetry of the reel coincides with the plane 75, see FIG. 3. After this the magnetic tape 4, disposed on the vaccum pad 72, is pivoted away in the counterclockwise direction by a pivotal movement of the block 70 in the direction indicated by arrow 116 in FIG. 2. Thus, vacuum pad 73 is aligned with the vacuum pad 71, see FIG. 4D. the control electronics of the apparatus then ensure that the pull-out yoke 67 is moved in a downward direction, so that the pins 62 and 63 are moved downwards from the position shown in FIG. 5a, the leader tape 111 being positioned on the splicing table 68 and being moved downwards by the pins 62 and 63 so far that it is almost completely withdrawn from the cassette, until the ends of the tape 111 on the reels 112 are reached. The leader tape 111 is now positioned on the vacuum pads 71 and 73. The control electronics then cause the pull-out yoke 67 to move back in the upward direction, so that the pins 62 and 63 again assume a rest position in the passage 64. The housing 85 is now moved back, so that the unlocking pin 88 and the winding mandril 86 are withdrawn from the cassette 34. In the next step the cassette holder 32 is pivoted from the position indicated by the broken lines in FIGS. 2 and 3 in the direction indicated by the arrow 115 through an arc of approximately 30°, namely to the position indicated by the solid lines in FIG. 2. After this the cutter 79 severs the leader tape 111. By withdrawing the tape 111 from the cassette by means of the pins 62 and 63 in the manner described, two parts of leader tape 111 of substantially equal length are obtained. Subsequently, the second block 70 is pivoted back in the clockwise direction about the axis 74, so that again the position shown in FIG. 4C is occupied. As is shown in FIG. 3, this has the advantage that the movement of the leader tape 111 is limited owing to the special position of the pivotal axis 33 in the plane 75 between the pivotal axis 74 and the upper surface of the vacuum pad. In this way there is no risk that the position of the end portion of the leader tape on the vacuum pad 73 can be disturbed by forces acting in the longitudinal direction of the leader tape. In the position of the splicing table as shown in FIG. 4C the end of the right-hand length of leader tape 111 is now situated on the right-hand side on the pad 71, while the leading end of the magnetic tape 4 is still positioned on the pad 72. Subsequently, the mounting plate 92 to which the splicing member 75 is secured is moved downwards by the electronics of the apparatus. After this movement has been completed the punch 94 is urged downwards by the cylinder 95 to punch a portion out of the adhesive tape 97, which portion subsequently joins the ends of the magnetic tape 4 and the leader tape 111 to each other. During the downward movement of the punch 94 the vaccum channel in the porch is evacuated, thereby ensuring that the adhesive-tape portion is retained on the punch durng the movement towards the splicing table 68. During these movements the adhesive tape 97 is fed from the right-hand roller 96a to the left-hand roller 96b. The vacuum in the punch 94 is then released, and the punch is withdrawn upwards by the cylinder 95. In the next step the roller 105 is actuated by the piston rod 103, so that it is moved across the splicing table 98. As a result of this movement the adhesive-tape portion is pressed home, residual air between the tape ends to be joined and the adhesive-tape portion thus being removed. Now the mounting plate 92 is returned to the upper position. After this has been completed the cassette holder 32 can move back from the splicing position in the direction indicated by the arrow 116 to the winding position indicated by the broken lines. During this movement the favorable position of the pivotal axis 33 also ensures that the left-hand part of leader tape 111 which is disposed on the vaccum pads 73, remains in the correct position. It is to be noted that the position of the pivotal axis 33 has the advantage that the pivotal movements in the direction indicated by the arrow 116 and in the direction indicated by the arrow 115 between the splicing position and the winding position can be performed in a comparatively short time. In this respect it is of advantage that as a result of the position of the pivotal axis 33 this movement can be limited, namely to such an extent that the punch 94 has enough clearance for the splicing operation.

Next the control electronics actuate the alignment pin 81. Initially this pin occupies a rest position in the passage 64 as shown in FIG. 5a. By pivotal movement of the lever 82 the alignment pin is then pivoted in the direction indicated by the arrow 117 in FIG. 5a towards the position shown in FIG. 5b. In this operating position the pin is positioned in such a manner relative to the front opening 66 of the cassette that in a stage to be described hereinafter when the tape is wound in the tape is led directly from the guide portion 83 to the take-up reel 112 without any contact with other parts of the cassette. The semi-circular cross-section of the alignment pin has the advantage that the pin can move freely inside the comparatively narrow passage 64 from the rest position to the operating position. After this the vacuum of the vacuum pad 72 and the vacuum pad 71 is turned off. Subsequently, the housing 85 is moved forwards, the brake of the cassette is unlocked by the pin 88 and the winding mandril 86 is again coupled to the take-up reel 112, the reel 112 then being positioned relative to the plane 75. After this the motor 87 is started and the magnetic tape 4 can be wound into the cassette 34. During winding of the magnetic tape the number of revolutions of the capstan 19 is measured, the control electronics ensuring that winding is stopped after a specific length of magnetic tape has been taken up. The next step is that vacuum is applied again to the stationary vacuum pad 71. After this the capstan 19 feeds in some additional centimeters of magnetic tape 4. As a result of this the tape 4 is slackened at the location of the splicing table 68. In the next step the alignment pin 81 is returned from the operating position shown in FIG. 5b to the rest position shown in FIG. 5a. This step enables the yoke 67 with the pins 62 and 63 to be moved downwards again. After the pins have been moved downwards vacuum is applied to the vacuum pad 72. In this way the magnetic tape 4 is drawn onto the vacuum pad 72. After this the pull-out pins 62 and 63 can be moved upwards again. Once this has happened the housing 85 moves back in a direction opposite to that indicated by the arrow 114, so that the brake mechanism in the cassette is reactivated and the reel 112 is disengaged from the winding mandril 86. Subsequently the cassette holder is pivoted into the oblique position as indicated by the arrow 115. Then the cutter 79 is reactivated, so that the magnetic tape 4 is then severed. The leader tape on the vacuum pad 173 is aligned with the end portion of the magnetic tape 4 on the vacuum pad 71 by a pivotal movement of the second block 70 in the counterclockwise direction. The next step is that in a manner as already described in the foregoing an adhesive-tape portion is applied by means of the punch 94, so that the left-hand portion of the leader tape 111 is connected to the end of the magnetic tape 4. After the return movement of the punch 94 the adhesive tape is pressed home by means of the roller 105. The mounting plate 92 is then moved upwards again. Subsequently, the cassette holder 32 is pivoted back to the winding position in the direction indicated by the arrow 116. After this the housing 85 is moved forwards again and the vacuum of the vacuum pads 71 and 73 is shut off. After this the remaining length of magnetic tape 4 to which the leader tape 111 is connected is wound onto the reel 112 by means of the winding mandril 86 after unlocking of the brake mechanism by means of the pin 88. Then the housing 95 is moved again. The cassette is now filled completely. The slide 31 and the cassette holder 32 are then moved back to the right, as indicated in FIG. 2. Subsequently the projections 39 and 44 abut with the unlocking strips 42 and the projection 44 respectively, so that the cassette is released and can be removed from the cassette holder 32.

It is to be noted that the pivotal movement of the cassette holder 32, as shown in FIGS. 2 and 3, from the winding position to the splicing position in the direction indicated by the arrow 115 is effected under the influence of two springs 118, of which the right-hand spring is shown in FIG. 2, which is possible only when the cylinder 58 is not activated. Each spring 118 has its left end secured to the slide 31 and its right end to an angular support 119 on the cassette holder 32. Furthermore, a set-screw 120 is provided on each corner support 119, which in the vertical position is in contact with the slide 31. Thus, by adjusting the set-screws 120 the cassette holder can be positioned accurately in the vertical position relative to said plane 75 thereby ensuring that the plane of symmetry of the reel 112 coincides with the plane 75.

What is claimed is:

1. An apparatus for filling a cassette with a length of magnetic tape, which cassette comprises two adjacent reels which are connected to a length of leader tape, which apparatus comprises:
    a cassette holder for holding the cassette to be filled, which cassette holder is movable between at least two positions,
    a splicing table for supporting a leading and a trailing end portion of the magnetic tape and for supporting the leader tape, which table is provided with three rectangular vacuum pads which are arranged aligned to each other, a first one of said vacuum pads being arranged on a stationary first block of the splicing table and a second and a third vacuum pad being arranged adjacent each other on a second block of the splicing table, which second block is pivotable about a block pivotal axis to bring the second or the third vacuum pad alternately in line with the first vacuum pad.
    an extraction member for drawing the length of leader tape wound around the reels out of the cassette and positioning the leader tape on the splicing table,
    a cutting member for cutting the leader tape into two parts and severing a length of magnetic tape having both a leading and a trailing end,
    a splicing assembly for resplicing the magnetic-tape leading and trailing end positioned on the splicing table to the ends of the parts of leader tape formed by the cutting member, and
    a winding member for winding the length of magnetic tape and leader tape into the cassette in cooperation with one of the reels,
    characterized in that
        the cassette holder is pivotable about a holder pivotal axis between a first position straight above the splicing table for cooperation with the winding member and a second position, in which it is inclined relative to the splicing table and in which the splicing assembly is operable,
        the holder pivotal axis is disposed at least substantially in a plane through the block pivotal axis, which plane bisects the width of the first vacuum pad, and
        the holder pivotal axis extends at least substantially parallel to the block pivotal axis between the block pivotal axis and the upper surface of the first vacuum pad.

2. An apparatus as claimed in claim 1, characterized in that the holder axis is situated at substantially equal distances from the block pivotal axis and the upper surface of the first vacuum pad.

3. An apparatus as claimed in claim 1 or 2, characterized in that in the first position of the cassette holder said plane, in which the holder pivotal axis is situated, coincides with a plane of symmetry through the reel of the cassette which cooperates with the winding member.

4. An apparatus as claimed in claim 3, characterized in that the holder pivotal axis is defined by a pivoting mechanism arranged in a slide which is translatable on guide rods.

5. An apparatus as claimed in claim 4, characterized in that the extraction member comprises two pull-out pins which are arranged on a yoke, said pins being disposed one to each side of the splicing table, and being movable back and forth with the yoke relative to the splicing table.

6. An apparatus as claimed in claim 3, characterized by comprising an alignment pin which in an operating position keeps the magnetic tape aligned relative to the plane of symmetry of the reel which cooperates with the winding member during winding, which alignment pin is arranged on a pivotal lever and can be pivoted from the operating position to a rest position, in which the alignment pin is not in contact with the leader tape or magnetic tape.

7. An apparatus as claimed in claim 6, characterized in that in the operating position of the alignment pin and in the first position of the cassette holder the alignment pin and the cassette are positioned in such a manner relative to each other that during winding after leaving the alignment pin, the magnetic tape is fed directly to the cassette reel which cooperates with the winding member without coming into contact with other parts of the cassette.

8. An apparatus as claimed in claim 6, characterized in that the alignment pin is semicircular in radial cross-section.

9. An apparatus as claimed in claim 4, said cassette having a lockable front cover system and a supporting surface, characterized in that the cassette holder comprises:
    pressure elements which urge the supporting surface of the cassette against supports of the holder, locating pins, which position the cassette in the holder, and an unlocking element which unlocks the front-cover system of the cassette.

10. An apparatus as claimed in claim 9, characterized by comprising a contoured member which during the movement of the slide urges the front cover system into an open position.

11. An apparatus as claimed in claim 5, characterized by comprising an alignment pin which in an operating position keeps the magnetic tape aligned relative to the plane of symmetry of the reel which cooperates with the winding member during winding, which alignment pin is arranged on a pivotal lever and can be pivoted from the operating position to a rest position, in which the alignment pin is not in contact with the leader tape or magnetic tape.

12. An apparatus as claimed in claim 11, characterized in that in the operating position of the alignment pin and in the first position of the cassette holder the alignment pin and the cassette are positioned in such a manner relative to each other that during winding after leaving the alignment pin, the magnetic tape is fed directly to the cassette reel which cooperates with the winding member without coming into contact with other parts of the cassette.

13. An apparatus as claimed in claim 1, characterized in that the extraction member comprises two pull-out pins which are arranged on a yoke, said pins being disposed one to each side of the splicing table, and being movable back and forth with the yoke relative to the splicing table.

14. An apparatus as claimed in claim 13, characterized by comprising an alignment pin which in an operating position keeps the magnetic tape aligned relative to the plane of symmetry of the reel which cooperates with the winding member during winding, which alignment pin is arranged on a pivotal lever and can be pivoted from the operating position to a rest position, in which the alignment pin is not in contact with the leader tape or magnetic tape.

15. An apparatus as claimed in claim 14, characterized in that in the operating position of the alignment pin and in the first position of the cassette holder the alignment pin and the cassette are positioned in such a manner relative to each other that during winding after leaving the alignment pin, the magnetic tape is fed directly to the cassette reel which cooperates with the winding member without coming into contact with other parts of the cassette.

* * * * *